June 14, 1927. 1,632,576
R. ALFISI
LOCK FOR AUTOMOBILES
Filed April 9, 1926 2 Sheets-Sheet 1

WITNESSES
Geo. N. Naylor
A. L. Kitchin

INVENTOR
Raffaele Alfisi
BY Munn & Co
ATTORNEYS

June 14, 1927.  R. ALFISI  1,632,576
LOCK FOR AUTOMOBILES
Filed April 9, 1926   2 Sheets-Sheet 2
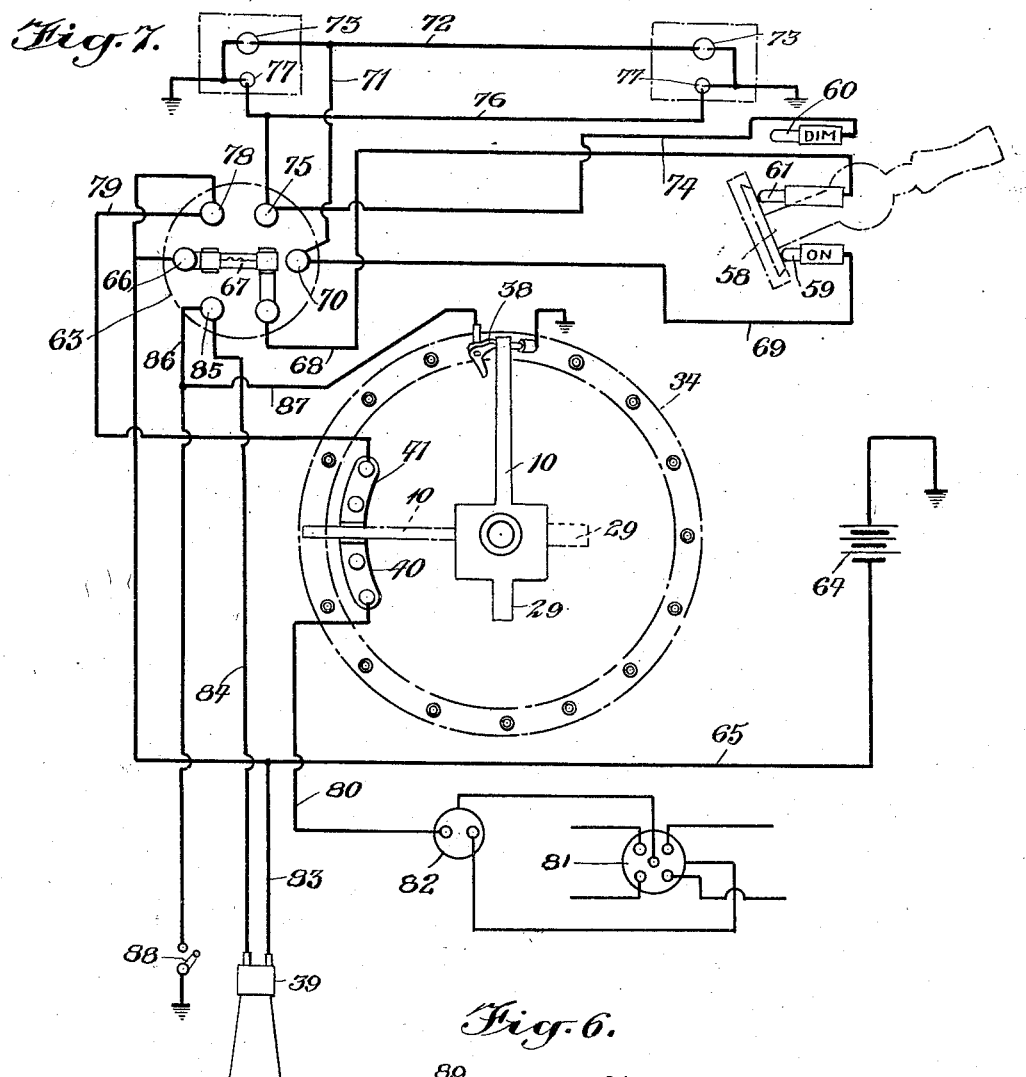
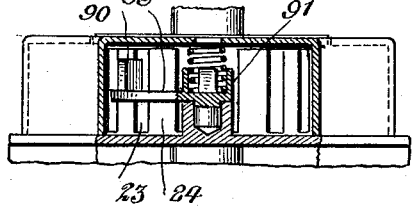
WITNESSES
INVENTOR
Raffaele Alfisi
BY
ATTORNEYS Patented June 14, 1927.

1,632,576

UNITED STATES PATENT OFFICE.

RAFFAELE ALFISI, OF BROOKLYN, NEW YORK.

LOCK FOR AUTOMOBILES.

Application filed April 9, 1926. Serial No. 100,936.

This invention relates to locks for automobiles and is an improvement over my prior application, Serial No. 18,890, filed March 27, 1925.

The object of the invention is to provide an improved structure, which when locked, cannot be unlocked without taking the device apart.

Another object of the invention is to provide a lock for automobiles wherein the same is manipulated for opening and closing the circuit of the ignition and for opening and closing the pipe through which the gasoline flows when the parts are properly operated while the parts are so arranged that the ignition will remain open and the gasoline supply pipe remain closed when the device has been improperly actuated.

A further object of the invention is to provide an improved lock for automobiles wherein the parts are held against operation by an auxiliary lock, which when operated, permits an authorized person to manipulate the device for closing the ignition circuit and opening the gasoline supply pipe and at the same time permitting an unauthorized person to manipulate the device for locking the same in a given position and at the same time closing the circuit of the horn or other signaling device.

In the accompanying drawings—

Figure 6 is a detail fragmentary sectional view through Figure 1, approximately on line 6—6.

Figure 7 is a diagram showing the wiring and other parts and illustrating how the same are connected to the different parts of the automobile.

Figure 1:
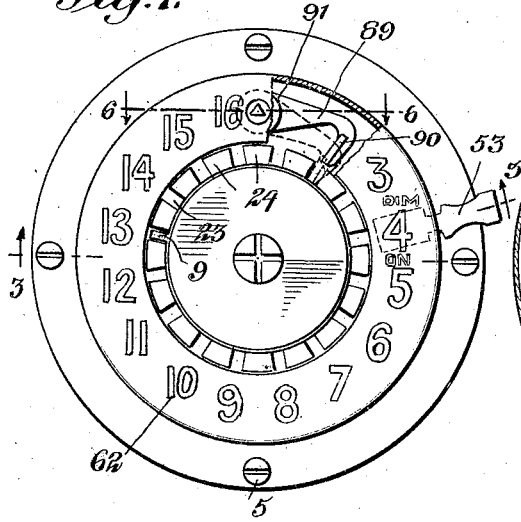
Figure 1 is a top plan view of the device disclosing an embodiment of the invention, part being broken away for illustrating certain details of the invention.

In constructing the device embodying the invention, it is aimed to connect the same to the headlights, the horn or other signalling device of the automobile as well as to the ignition circuit of the engine and the gasoline supply pipe of the engine. By properly manipulating certain parts of the device, the headlights may be turned on either bright or dim and associated with the device is the horn of the automobile which may be manipulated independently of the device or when the device has been moved to an inoperative position either by an authorized or unauthorized person. When this occurs, the horn or other sounding device will continue to operate until the circuit has been opened at some point. In addition, the device acts to control the current to the ignition system of the automobile and to control the flow of gasoline to the engine of the automobile, these parts being so constructed and arranged that an authorized person may readily operate the device to secure the desired result while an unauthorized person would actuate the device to lock the same against functioning.

Referring to the accompanying drawings by numerals, 1 indicates a casing having a flared portion 2 and supplied with an interior lining 3 of insulating material. A plate 4 is mounted on flange 2 and secured thereto by suitable screws or other fastening means 5. A cap or covering structure 6 is also provided and connected with the plate 4 by the screws 5. The cap 6 is provided with an opening or central bore 7 through which the plate 8 moves. The plate 8 is provided with a pointer 9 continually maintained in alignment with the arm 10 hereinafter fully described. The plate 8 is preferably integral with the sleeve 11, said sleeve merging into an enlargement 12 having a flange 13. A hand wheel or member 14 fits over the enlargement 12 and rests on flange 13, said hand wheel or member 14 being held in place by any suitable means, as for instance, set screw 15. Preferably the upper part of member 12 is provided with a squared portion 16 in the bore thereof so that the hollow shaft 17 may be held against turning, said hollow shaft having flattened portions 18 (Figure 5), said flattened portions fitting the squared portions 16. A screw 19 extends through the upper part of member 14 and is threaded into the hollow shaft 17 whereby said hollow shaft is locked in place with the flattened portions 18 against the squared portions 16.

Figure 5:
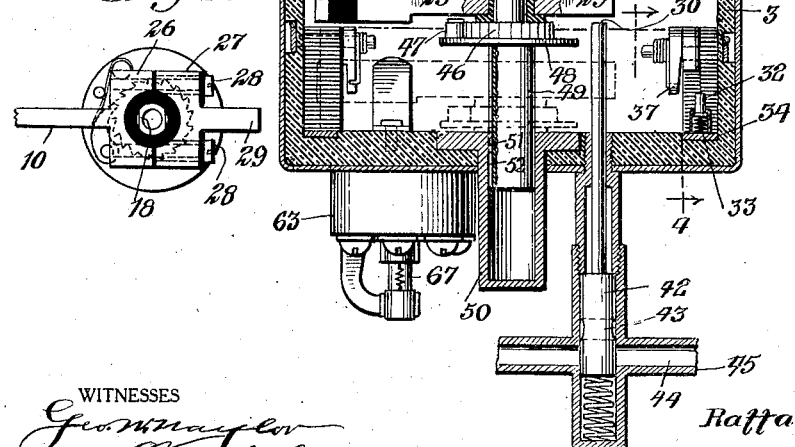
Figure 5 is a detail fragmentary sectional view through Figure 3 on line 5—5.

By reason of this construction and arrangement, whenever the hand wheel 14 is rotated, shaft 17 and parts connected therewith will also be rotated as well as the disk 8. An auxiliary sleeve 20 is preferably formed integral with the disk 8 and extends in the opposite direction from the disk to sleeve 11, said auxiliary sleeve 20 having the lower end journaled in the boss 21 of plate 4. It will be noted that the plate 4 is provided with an annular upstanding flange structure 22 which is provided with a number of slits 23. These slits preferably extend for the full height of flange 22 and thereby convert this flange into a number of vertical posts or blocks 24 as shown particularly in Figure 1. An insulating spool 25 is carried by the arm 10 and surrounds shaft 17, said spool being rigidly clamped to the shaft by the clamping enlargements 26 and 27 of arm 10, said clamping enlargements being caused to function by reason of the screws 28 (Figure 5.) It will be noted that the arm 10 is provided with an extension 29 opposite the main part of the arm, said extension acting on the rod or pin 30 as hereinafter fully described. The arm 10 near the outer end is provided with an insulating block 31 arranged on one side and extending from the bottom of the arm to near the top. The arm 10 is preferably flat on the lower surface as shown in Figure 4 so as to readily contact with the contact pin 32 which is resiliently supported by a suitable spring mounted in the housing 33 rigidly secured to the ring 34. The ring 34 acts as a ground for all of the contacts 32 while the opposite side of the circuit is connected with the various catches 35. These catches are mounted on insulating blocks 36 and are resiliently held in a given position by suitable springs 37. The contact portion or extension 38 is resiliently held against the upper edge of the arm 10 immediately above the insulating block 31 when the arm is in its fully lowered or inoperative position as shown in Figure 4. The contact or extension 38 acts in the double capactiy of providing a contact for completing the circuit of the horn or other signalling device 39 and as mechanical means for locking the arm 10 against removal. The arm 10 moves to the position shown in Figure 4 only when operated by an unauthorized person as an authorized person who knows the secret of the device will always move arm 10 so that it will be in the position shown in Figure 2 before the arm is pressed downwardly or to its inner position.

Figure 2:
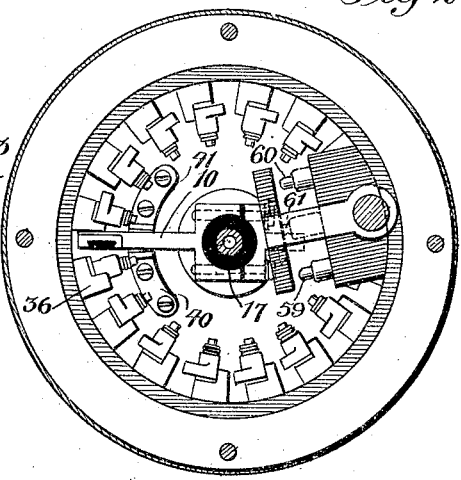
Figure 2 is a sectional view through Figure 3 on line 2—2.
Figures 3, 4:
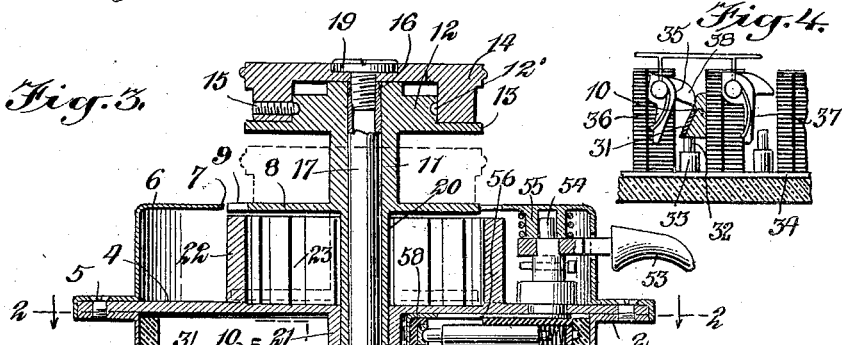
Figure 3 is a sectional view through Figure 1, approximately on line 3—3, certain duplicated parts at the rear of the figure being omitted for the purpose of clearness.
Figure 4 is a detail fragmentary sectional view through Figure 3 on line 4—4.

As indicated in Figure 2, the insulating block 36 near the contact plate 40 is not provided with a contact extension 38 so that the arm 10 may move past this block back and forth freely. Co-acting with the contact 40 is a second contact 41 which is provided with suitable upstanding contact members somewhat resilient whereby when the arm 10 is moved to a position in line with the position shown in Figure 2 it may be readily forced downwardly or rather inwardly until the arm is pinched between the contacts 40 and 41. When in this position it is not locked but the ignition circuit of the engine is closed as contacts 40 and 41 are interposed in this circuit. At the same time that the arm 10 moves downwardly to close the ignition circuit as described, the extension 29 of arm 10 will strike the pin 30 and force the same downwardly. This pin carries a valve 42 having a passage-way 43. The downward movement of the parts is such that the passage-way 43 will be brought into registery with the passage-way 44 in the pipe 45, which pipe supplies the gasoline to the carburetor of the engine. It will thus be seen that when the arm 10 is swung around to the correct position as shown in Figure 2 and is then forced downwardly for its extreme movement, the ignition circuit of the engine will be closed and the gasoline supply pipe will be opened. The engine may readily be started either by the usual starter or by cranking or in any other desired way.

If any one should move the arm 10 to a position other than that shown in Figure 2 and then force the same downwardly, the arm would be moved to the position shown in Figure 4 and caught in this position and held by member 38. The arm could not be moved upwardly without taking the device to pieces or partly to pieces which would require more time than a thief could spare, particularly as the contact of members 38 with arm 10 would close the circuit of the horn 39 and produce a signal. In addition, the arm 10 would miss the contacts 40 and 41, the extension 29 would miss pin 30 so that the engine would still be deprived of gasoline and the ignition circuit would still remain open. Having once been caught in the position shown in Figure 4, the thief could not remove the arm to shift the same to another position as there is no means of moving the member 38 away from arm 10 without first removing a large part of the mechanism of the device. In addition, it has been found desirable to always cause the arm 10 to rotate in one direction and in order to bring this about, a ratchet wheel 46 is rigidly secured to the shaft 7 and co-acts with the pawl 47 carried by the disk 48, which disk is rigidly secured to the sleeve 49. The sleeve 49 is permitted to reciprocate in the well 50 but is held against rotation by the key 51 operating in the slot 52.

In order to turn on and off the headlights of the automobile, a lever 53 is provided which is rigidly secured to a shaft 54, said shaft being rotatably mounted in a hollow boss 55 and positioned with the lower part extending through plate 4. An arm 56 is rigidly secured to the lower end of shaft 54 and carries an insulating block 57 in which is embedded a metallic plate 58. The plate 58 extends from near one end of block 57 to near the opposite end and is adapted to come into contact with the respective contact pins 59 and 60 and to remain continually in contact with the pin 61. When the bar 58 is in contact with the pin 59, the headlights are on bright while if the parts are swung until the bar 58 is in contact with the pin 60, the headlights are on dim. The operation of the lever 53, however, does not in any way affect the locking mechanism of the device and may be manipulated at any time by any one.

From Figure 1 it will be noted that the cap 6 is provided with a large number of designations or legends 62 which are shown as numbers. Any desired number of these numerals or designations may be provided, there being one, however, for each of the slots 23. In the accompanying drawings, the slot 23 is the correct slot in which pointer 9 is to enter when arm 10 is to be inserted between the contacts 40 and 41 for permitting a proper operation of the engine. If pointer 9 enters any of the other slots, no results will be accomplished except the fact that arm 10 will be locked in the lower position as shown in Figure 4 and the horn 39 continually sounded so as to attract attention to the fact that an unauthorized person has operated the device with a view of possibly stealing the automobile.

In Figure 7 will be seen a diagram showing the various wirings needed to carry out the invention. From this figure it will be observed that there is provided a fitting 63 for receiving the various lead-in wires and causing a proper distribution of the electric current from the battery or other source 64. When the bar 58 is arranged as shown in this figure, current will pass from the source 64 through wire 65, binding post 66 and from thence through the fuse 67 to wire 68, from wire 68 to contact pin 61, cross bar 58, through pin 59, wire 69, binding post 70, wire 71, wire 72 through the bright filaments 73 and from thence to the ground. It will be noted that wire 72 connects both the bright filaments 73 so that both will be lighted at the same time. If bar 58 was moved until it engaged pin 60, current would pass in the same manner as above described from the source to the pin 61 and from thence to pin 60, through wire 74, binding post 75 to wire 76 and from thence through the dim filaments 77 to the ground. In this way, current may be supplied to either the bright or dim filaments of the headlights. When the arm 10 is in its operative position in engagement with the contacts 40 and 41, current is supplied to the distributor and from thence to the spark plugs of the engine. As a circuit, it will be noted that the current will pass from the source 64 through wire 65 to binding post 78, through wire 79 to the contact 41, through this contact and arm 10 to contact 40 and from contact 40 through wire 80, coil box 82, distributor 81 and back to the source through the ground. In case the arm 10 is moved to a position other than between the contacts 40 and 41, it will occupy the position shown in Figure 4 and, consequently, current will pass from the source 64, through wire 65, wire 83 to the horn 39 and through the horn to wire 84 and through wire 84 to contact 85, wire 86, wire 87 to the extension 38, through said extension to the arm 10 and through the arm 10 to contact pin 32 to ring 34 and from thence to the ground. This will cause the horn 39 to sound continually independently of the manually actuated switch 88. When it is desired to cause the horn 39 to be sounded as a signal during the use of the automobile, switch 38 is temporarily closed and current is supplied directly to the horn independent of arm 10 and associated devices.

In operation, when it is desired to use the device, pointer 9 is moved around to a position opposite 13 as shown in Figure 1. The hand wheel 14 and associated parts are then pushed downwardly to the dotted position shown in Figure 3 whereupon arm 10 will be gripped between the contacts 40 and 41. After the automobile has been used and it is stopped, the operator holds the knob 14 until the parts assume the position shown in Figure 3 and then turns the knob while in this raised position until pointer 9 is opposite some other notch than 13. If an unauthorized person attempts to operate the device, unless he guesses the slot opposite numeral 13, he will cause the arm 10 to be caught by extension 38 and produce a continuous signal while at the same time preventing a closing of the ciruit of the ignition system and preventing the flow of gasoline to the engine as the valve 42 would not be operated. It has been found that children and other innocent parties may shift the hand wheel 14 and may then press the same inwardly without any intention of stealing the automobile. To prevent the catching of the arm 10 by the extension 38, an auxiliary lock is provided which consists of an arm 89 pivotally supported on plate 4, said arm having an upstanding section 90. The arm 89 is provided with a boss or enlargement 91 having a triangle-shaped opening which is adapted to receive a triangle-shaped key whereby the arm 89 may be swung to the dotted position shown in Figure 1 whereupon the extension 90 will fit in between certain of the posts 24. Extension 90 is approximately half the height of the post 24. When extension 90 is in this position and it is attempted to press the hand wheel 14 downwardly, this cannot be done fully as the plate 8 will strike the extension and, consequently, prevent arm 10 from entering the space beneath any of the extensions 38. It will, therefore, be necessary for some one having a proper key to unlock lever 89 before the device can be operated. This will prevent children and other innocent persons from accidentally operating the device or rather shifting the arm 10 to the position shown in Figure 4. If a thief should operate the lever 89, which would be comparatively easy, it would then be necessary for him to properly operate knob 14 for causing arm 10 to engage the contacts 40 and 41. As the thief would not know which slot 23 to utilize, he would almost invariably choose the wrong slot and in pressing the wheel 14 inwardly, would cause the arm 10 to assume the position shown in Figure 4 with the results above outlined.

It will be noted that the pointer 9 enters the slot at number 13 with the parts set as shown in Figures 1 and 2. In case the owner should desire to change the combination, he would in effect, hold the arm 10 in the position shown in Figure 2 and would then shift pointer 9 to some other place, as for instance, to a point opposite slot 15. The parts would then be locked together so that the arm 10 and pointer 9 would thereafter move together but it will be necessary to always move pointer 9 to slot 15 before arm 10 could be moved to its correct position as shown in Figure 2. By reason of ratchet 46, shaft 17 and associated parts can be rotated in one direction only. The hand wheel 14 is connected to the enlargement 12 by the set screw 15. The enlargement 12 is provided with a number of depressions 12'. In fact, there is one depression 12' for each of the numbers or legends 62 and they are spaced the same distance relatively. When it is desired to change the combination as above mentioned, set screw 15 is unscrewed and hand wheel 14 is held stationary manually while the disk 13, sleeve 11 and associated parts including the pointer 9 are rotated the desired distance, as for instance, until pointer 9 is immediately above the slot indicated at 15 in Figure 1. Set screw 15 is then screwed down tight and the change of combination has been completed so that hereafter point 9 must always be moved to slot marked 15 in Figure 1 before it can be properly operated to cause arm 10 to close the ignition circuit and the other parts function in the proper manner. If it is desired to change the combination a second time or a number of times, the same operation is carried out.

What I claim is:

1. A lock for automobiles provided with an ignition circuit comprising a valve for controlling the gasoline pipe of the automobile engine, means acting as a switch contacts interposed in said ignition circuit, a manually actuated structure for connecting said contacts and simultaneously opening said valve, and means co-acting with the manually actuated structure for preventing the bridging of said contacts and the opening of the valve when the manually actuated structure is moved to other than a particular point.

2. A lock of the character described comprising a valve for controlling the flow of gasoline, a reciprocating member for moving the valve to an open position, spring means for moving the valve to a closed position, and means for latching the reciprocating means against functioning.

3. A lock for automobile engines provided with an ignition circuit, said lock including a pair of spaced contacts interposed in said ignition circuit, a reciprocating and rotating shaft, an arm carried by said reciprocating and rotating shaft, said arm being of a size to connect said contacts when the reciprocating shaft is moved in its extreme inner position, a series of catches positioned to independently engage said arm for locking the same in an inner position when moved thereto, a pointer carried by said shaft, a series of numbers arranged adjacent said pointer for guiding an authorized person in positioning said pointer so that when the reciprocating shaft is moved to its inner position the arm will engage the contacts for closing the ignition circuit.

4. A lock for automobile engines having an ignition circuit including a rod and reciprocating member, an arm carried by said member, means co-acting with said member when the same is not in its correct position for locking the same against movement after it has been moved to an extreme inner position, means for causing said arm to close said ignition circuit when the arm is moved to a certain extreme inner position, and a manually locked structure for normally preventing the inward movement of said arm.

5. In a lock for automobile engines, a casing, a cover for said casing, a plurality of legends arranged on said cover, a pointer positioned adjacent said members, a reciprocating structure, an arm rigidly secured to said reciprocating structure whereby the pointer will indicate the relative position of the arm, means for latching the arm in an extreme inner position when moved to a certain inner position, a pair of spaced contact points adapted to having the gap therebetween bridged by said arm when moved to a second inner position, and manually actuated means for normally preventing the inward movement of said reciprocating structure.

RAFFAELE ALFISI.